Figure 1:
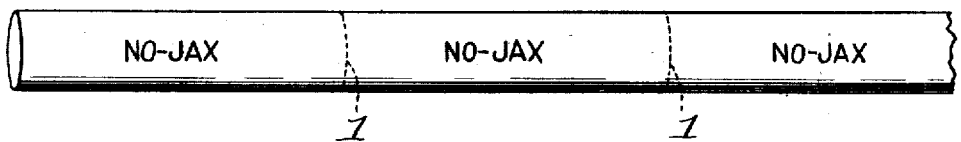

May 22, 1934.  E. O. FREUND  1,959,978

SAUSAGE, ARTIFICIAL CASING THEREFOR, AND THE PRODUCTION THEREOF

Filed Jan. 12, 1931

Inventor:
Erwin O. Freund
By Dyrenforth, Lee, Chritton & Wiles
Attys.

Patented May 22, 1934

1,959,978

UNITED STATES PATENT OFFICE 1,959,978

SAUSAGE, ARTIFICIAL CASING THEREFOR, AND THE PRODUCTION THEREOF

Erwin O. Freund, Chicago, Ill., assignor to The Visking Corporation, Chicago, Ill., a corporation of Virginia Application January 12, 1931, Serial No. 508,278

11 Claims. (Cl. 99—8)

This invention relates particularly to means whereby a cellulose sausage casing may be so printed or marked, that the print or mark on the casing will stand the rather severe treatment which the casing necessarily undergoes in packing house processes. The invention relates further to the production of marked stuffed sausages. Thus, in the operations of stuffing and curing the sausages, the casing may be subjected to wetting, smoking and cooking.

The methods heretofore used by sausage manufacturers for identifying or otherwise marking their product are unsatisfactory for obvious reasons. These methods include: (1) the use of a tag tied to the sausage; (2) the placing of a printed band upon the sausage, similar to a cigar band; (3) the use of a decalcomania transfer applied to the sausage after it has been manufactured; and (4) branding the sausage, after manufacture, by means of a heated die, or mark.

The present invention is capable of application to artificial casings for use in preparing ordinary sausages, wiener sausages, Bologna sausage, etc.

In the preparation of wiener sausages for example, the method described in Freund Patent Number 1,631,723 granted June 7, 1927, and in Dietrich Patent Number 1,718,896 may be followed.

Ultimately, after the curing operation and after the product has reached the customer, if desired, the casing may be removed from the body of the sausage by a stripping operation.

Heretofore, it has not been practicable to apply trade-marks or other printed matter to sausage casings for the reason, among others, that the printing would not withstand the curing operations, such as smoking, cooking, etc.

Cellulose sausage casings, produced by extruding viscose in tubular form, are now available on the market. Such casings present a surface which is neither porous nor absorbent to any great extent. I have found that it is possible, by employing an ink having certain characteristics, to print upon cellulose casings in a satisfactory manner, and that such printed matter will withstand the curing operations to which sausages are subjected in ordinary packing house operations.

To enable this to be done, it is necessary to employ an ink which can be hardened by the escape of volatile ingredients, or by a chemical change (usually oxidation) of the fluid medium which carries the pigment or by a combination of these two processes, to form a dense insoluble film which will adhere to the smooth, comparatively non-porous cellulose surface, not only in dry condition of the casing, but under the conditions which exist in wetting the casing, or smoking and/or cooking of the sausage.

It is necessary, also, in order to insure good results, that the ink employed shall have great covering or hiding power. That is, the ink must possess high opacity, and be visible almost entirely by its ability to reflect light. The casing itself is highly transparent, and if the ink transmits light in any considerable amount, the result is a dull and undesirable color effect.

Figure 2:
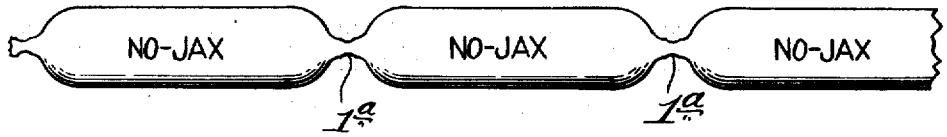

The invention is illustrated in the accompanying drawing, in which Figure 1 is a broken view, slightly in perspective, of a sausage casing having a trade-mark applied thereto by suitable printing operation, in accordance with the invention; and Fig. 2 is a broken view of a string of sausages after having been subjected to the curing operation, the trade-mark appearing intact on the casing.

In the illustration given, the cellulose casing is designated A. Such a casing may be prepared by extruding viscose solution in tubular form, subjecting it to the action of coagulating and regenerating agents, and then purifying the casing by passing it through suitable purifying baths of water. The casing may ultimately be passed through an aqueous bath containing a moderate percentage of glycerin, or other hygroscopic agent. The excess liquid may be expressed from the casing, and the casing may then be suitably dried. The small percentage of glycerin which remains in the casing attracts a slight amount of moisture, keeping the casing moderately soft and pliable. A casing of this character may have a wall of various thickness, depending upon the diameter of the casing. The small casings may have a wall thickness of perhaps .003 of an inch. In any case, the film is quite transparent.

In practicing the present invention, an ink of the following composition may be used, the percentages being indicated by weight:

| | Per cent |
|---|---|
| Pigment (such as an oxide of titanium) | 60–65 |
| Fluid medium or menstruum | 40–35 |

The fluid medium, or fluid vehicle, which carries the pigments, preferably comprises:

| | Per cent |
|---|---|
| Waterproof spar varnish | 10–20 |
| Unsaponifiable waxy or greasy matter (for example 5 to 7 parts of paraffin and 100 parts vaseline) | 5–10 |
| Lithographic linseed oils (known as litho-oils) | 70–85 |

Any suitable spar varnish may be employed. Preferably a varnish known in the varnish trade as "long oil" China-wood varnish is used. For example the varnish may comprise 25 gallons of a drying oil, preferably China-wood oil to 100 pounds of a natural or synthetic resin, or a combination of such resins. Thus, ester gum, or other natural gums may be employed; or synthetic gums, such as potentially reactive phenol-condensation products may be employed.

A suitable waterproof spar varnish may be used in accordance with the specifications of the Bureau of Standards, entitled: "United States Government Master Specification for Varnish, Spar Water Resisting", Federal Specifications Board No. 18b.

Any suitable substitute may be employed for the paraffin and vaseline mixture of the waxy character set forth above. Where a mixture of paraffin and vaseline is employed, preferably they are in the proportion of 5 to 7 parts paraffin to 100 parts of vaseline.

The lithographic linseed oil employed is one which has been changed in consistency by the application of heat. A suitable range of consistencies is from 0000 to No. 8, as designated in the trade pertaining to litho-oils.

Having compounded an ink of the character indicated, it is printed upon the casing in any suitable manner. Preferably, the casing is passed through a printing machine which applies the printing at suitably spaced points. Thus, in the illustration given, the mark "No jax" has been printed upon successive portions or sections, at uniformly spaced intervals, the lines of division of the sections being indicated by dotted lines 1.

In Fig. 2 is shown a sausage which has been "linked" and subjected to curing operations. The filled casing has been pinched at points 1ª, corresponding with the dotted lines 1. For example, a sausage may be strung upon a frame in the manner shown in Dietrich Patent No. 1,718,896 the stuffed sausage being pinched at intervals by resilient grippers; and the sausage thus supported is subjected to a curing operation, such as smoking.

The ink employed in the printing operation withstands the acids, smoke, fumes, fats, etc., and also is insoluble in boiling water, notwithstanding the fact that the ink resides almost wholly on the surface of the casing. The drying occurs by reason of the escape of volatile ingredients or by oxidation, or both. The printed casing may, if desired, be subjected to the action of a current of heated air as it passes from the printing machine, thus expediting the drying and "setting" of the ink.

It has been found that cellulose casings thus printed will carry the printed matter satisfactorily through the various operations in the packing house, without blurring. The printed matter or design will retain its clear outlines; and by reason of the hiding power of the letters or characters, they will appear in strong, brilliant color, due to the very effective reflection of light by the printed matter.

The invention renders it possible for a manufacturer of sausages to apply his trade-mark, and other printed matter, if desired, to his product. This is especially desirable in that class of product in which the cellulose casing is to be stripped from the body of the sausage prior to the consumption of the sausage.

While the linking of the sausage has been illustrated, it is to be understood that the sausage (using the term in its broadest significance) may be cut into sections. For example, Bologna sausage may be cut into sections or slices and need not be linked.

The foregoing detailed description has been given for clearness of understanding, and no unnecessary limitations should be understood therefrom.

What I regard as new and desire to secure by Letters Patent is:

1. A method of producing a marked stuffed sausage which comprises: imprinting a mark or character in waterproof, smoke-proof, opaque ink upon a substantially dry cellulose casing and hardening the ink; stuffing the casing; and subjecting the stuffed product to a curing operation.

2. As an article of manufacture, a cured sausage comprising a filling of sausage meat and a pre-printed cellulose casing bearing on its surface exposed characters in ink which have withstood the curing operations (smoking, cooking, or both) to which the filled casing was subjected.

3. As an article of manufacture, a regenerated cellulose sausage-casing bearing on its surface exposed printed hardened opaque ink characters, said characters being proof in exposed condition against hot water, and smoke fumes, whereby the printed casing may be stuffed with sausage meat and the stuffed product may be cured without substantial injury to said characters.

4. As an article of manufacture, a regenerated cellulose sausage-casing, bearing on its surface, exposed printed hardened opaque ink characters proof in exposed condition against hot water and smoke fumes, the ink forming said characters comprising pigment and a fluid menstruum comprising water-proof spar varnish, unsaponifiable waxy or greasy matter, and litho-oils.

5. A regenerated cellulose casing for sausages, etc., having thereon a series of like prints or characters comprising exposed hardened, insoluble, smoke-proof, opaque ink, said prints or characters being spaced from each other to correspond with sections into which the casing may be divided.

6. A method of producing a marked, stuffed cured sausage which comprises: imprinting a mark or character in waterproof, smoke-proof opaque ink upon a substantially dry, regenerated cellulose casing, said ink comprising a major portion of pigment and a minor portion of fluid menstruum which comprises a water-proof varnish, unsaponifiable waxy or greasy matter, and a litho-oil; hardening the ink; stuffing the printed casing with sausage material; and subjecting the stuffed product to a curing operation which includes smoking, cooking, or both.

7. As an article of manufacture, a cured sausage comprising a filling of sausage meat and a pre-printed regenerated cellulose casing bearing on its surface exposed hardened characters of ink comprising a major portion of pigment and a minor portion of water-proof varnish, unsaponifiable waxy or greasy matter, and litho-oil.

8. As an article of manufacture, a regenerated cellulose sausage-casing bearing on its surface exposed printed hardened opaque ink characters, which are proof in exposed condition against hot water and smoke fumes, the ink forming said characters comprising not less than about 60% pigment and the remainder hardened water-proof spar varnish, unsaponifiable waxy or greasy matter, and litho-oils.

9. As an article of manufacture, cured sausage comprising a filling of sausage meat, and a pre-printed regenerated cellulose casing bearing characters in hardened ink which have withstood curing operations, such as smoking, cooking, or both, said characters comprising, in a hardened state, pigment in major proportion, waxy or greasy matter, and litho-oils in larger proportion than said waxy or greasy matter.

10. As an article of manufacture, a printed, regenerated cellulose sausage-casing, bearing on its surface hardened opaque ink characters, the ink forming said characters comprising not less than about 60% pigment and a hardened menstruum comprising water-proof spar varnish, unsaponifiable waxy or greasy matter, and litho-oils.

11. As an article of manufacture, a printed, regenerated cellulose sausage-casing, bearing on its surface hardened opaque ink characters, the ink forming said characters comprising not less than about 60% pigment and a hardened menstruum comprising water-proof spar varnish, unsaponifiable waxy or greasy matter, and litho-oils, said varnish and said waxy or greasy matter forming a minor portion of said menstruum.

ERWIN O. FREUND.

DISCLAIMER 1,959,978.—*Erwin O. Freund,* Chicago, Ill. SAUSAGE, ARTIFICIAL CASING THEREFOR, AND THE PRODUCTION THEREOF. Patent dated May 22, 1934. Disclaimer filed January 23, 1943, by the assignee, *The Visking Corporation.*

Hereby disclaims claims 1, 2, 3, and 5 of said patent.

[*Official Gazette February 16, 1943.*]

9. As an article of manufacture, cured sausage comprising a filling of sausage meat, and a pre-printed regenerated cellulose casing bearing characters in hardened ink which have withstood curing operations, such as smoking, cooking, or both, said characters comprising, in a hardened state, pigment in major proportion, waxy or greasy matter, and litho-oils in larger proportion than said waxy or greasy matter.

10. As an article of manufacture, a printed, regenerated cellulose sausage-casing, bearing on its surface hardened opaque ink characters, the ink forming said characters comprising not less than about 60% pigment and a hardened menstruum comprising water-proof spar varnish, unsaponifiable waxy or greasy matter, and litho-oils.

11. As an article of manufacture, a printed, regenerated cellulose sausage-casing, bearing on its surface hardened opaque ink characters, the ink forming said characters comprising not less than about 60% pigment and a hardened menstruum comprising water-proof spar varnish, unsaponifiable waxy or greasy matter, and litho-oils, said varnish and said waxy or greasy matter forming a minor portion of said menstruum.

ERWIN O. FREUND.

DISCLAIMER 1,959,978.—*Erwin O. Freund*, Chicago, Ill. SAUSAGE, ARTIFICIAL CASING THEREFOR, AND THE PRODUCTION THEREOF. Patent dated May 22, 1934. Disclaimer filed January 23, 1943, by the assignee, *The Visking Corporation*.

Hereby disclaims claims 1, 2, 3, and 5 of said patent.

[*Official Gazette February 16, 1943.*]